US012445519B2

(12) United States Patent  
Dain et al.

(10) Patent No.: US 12,445,519 B2
(45) Date of Patent: Oct. 14, 2025

(54) METADATA BASED DATA DISTRIBUTION

(71) Applicant: International Business Machines Corporation, Armonk, NY (US)

(72) Inventors: Joseph W. Dain, Tucson, AZ (US); Frank N. Lee, Sunset Hills, MO (US); Yu-Cheng Hsu, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/583,684

(22) Filed: Feb. 21, 2024

(65) Prior Publication Data

US 2025/0267184 A1    Aug. 21, 2025

(51) Int. Cl.
*H04L 67/10* (2022.01)
*H04L 67/561* (2022.01)
*H04L 67/5651* (2022.01)

(52) U.S. Cl.
CPC ............ *H04L 67/10* (2013.01); *H04L 67/561* (2022.05); *H04L 67/5651* (2022.05)

(58) Field of Classification Search
CPC .............................. H04L 67/10; H04L 67/561
See application file for complete search history.

(56) References Cited

U.S. PATENT DOCUMENTS

| | | | |
|---|---|---|---|
| 10,025,791 B2 | 7/2018 | Lee | |
| 10,467,507 B1 * | 11/2019 | Hao | ................ G06F 18/2415 |
| 10,579,372 B1 | 3/2020 | Bahrami et al. | |
| 11,137,987 B2 | 10/2021 | Namarvar et al. | |
| 2015/0294233 A1 | 10/2015 | Aultman et al. | |
| 2019/0050688 A1 * | 2/2019 | Iyer | ...................... A61B 5/7267 |
| 2019/0220967 A1 * | 7/2019 | Bhatt | ..................... G06T 7/0002 |
| 2020/0296186 A1 * | 9/2020 | Lau | ....................... H04L 43/062 |
| 2022/0044117 A1 * | 2/2022 | Song | ........................ G06N 3/04 |
| 2022/0171738 A1 | 6/2022 | Lee et al. | |
| 2023/0237344 A1 * | 7/2023 | Wang | .................... G06F 16/258 706/12 |

FOREIGN PATENT DOCUMENTS

| | | | |
|---|---|---|---|
| CN | 103699693 B | 8/2015 | |
| CN | 111858555 B | 3/2021 | |
| CN | 110472109 B | 6/2022 | |
| WO | WO-2023240087 A1 * | 12/2023 | ............... G06N 3/09 |

* cited by examiner

*Primary Examiner* — Hieu T Hoang
(74) *Attorney, Agent, or Firm* — Zilka-Kotab, P.C.

(57) ABSTRACT

A computer-implemented method, according to one approach, includes: receiving, at an edge computing environment, internet of things (IoT) data generated by IoT devices in communication with the edge computing environment. One or more inference models are used at the edge computing environment to: classify the IoT data, and generate labeled metadata for the classified IoT data. The labeled metadata is further used at the edge computing environment to identify portions of the IoT data to transmit to a cloud computing environment. Copies of the identified portions of the IoT data are also sent to the cloud computing environment.

17 Claims, 5 Drawing Sheets

METADATA BASED DATA DISTRIBUTION

BACKGROUND

The present invention relates to data storage systems, and more specifically, this invention relates to metadata based data distribution.

As computing power continues to advance and the use of IoT devices becomes more prevalent, the amount of data produced continues to increase across the board. For instance, the rise of smart enterprise endpoints has led to large amounts of data being generated at remote locations. Data production will only further increase with the growth of 5G, 6G, etc., networks and an increased number of connected mobile devices. This issue has also become more prevalent as the complexity of AI models increases. Increasingly complex AI models translate to more intense workloads and increased strain associated with applying the models to received data.

While cloud computing has been implemented in an effort to improve the ability to process this increasing amount of data, the unprecedented scale and complexity at which data is being created has outpaced network and infrastructure capabilities. Sending all device-generated data to a centralized data center or to a cloud location has resulted in bandwidth and latency issues in conventional systems. As more devices are able to produce data and the amount of data being produced by each device in a system continues to increase, the strain associated with transferring all generated data back to a central location (e.g., cloud computing node) is unsustainable.

SUMMARY

A computer-implemented method (CIM), according to one approach, includes: receiving, at an edge computing environment, internet of things (IoT) data generated by IoT devices in communication with the edge computing environment. One or more inference models are used at the edge computing environment to: classify the IoT data, and generate labeled metadata for the classified IoT data. The labeled metadata is further used at the edge computing environment to identify portions of the IoT data to transmit to a cloud computing environment. Copies of the identified portions of the IoT data are also sent to the cloud computing environment.

A computer program product (CPP), according to another approach, includes: a set of one or more computer-readable storage media, as well as program instructions. The program instructions are collectively stored in the set of one or more storage media and are for causing a processor set to perform the foregoing CIM.

A computer system (CS), according to yet another approach, includes: a processor set and a set of one or more computer-readable storage media. The CS also includes program instructions that are collectively stored in the set of one or more storage media, and are for causing the processor set to perform the foregoing CIM.

Other aspects and implementations of the present invention will become apparent from the following detailed description, which, when taken in conjunction with the drawings, illustrate by way of example the principles of the invention.

DETAILED DESCRIPTION

Figure 1:
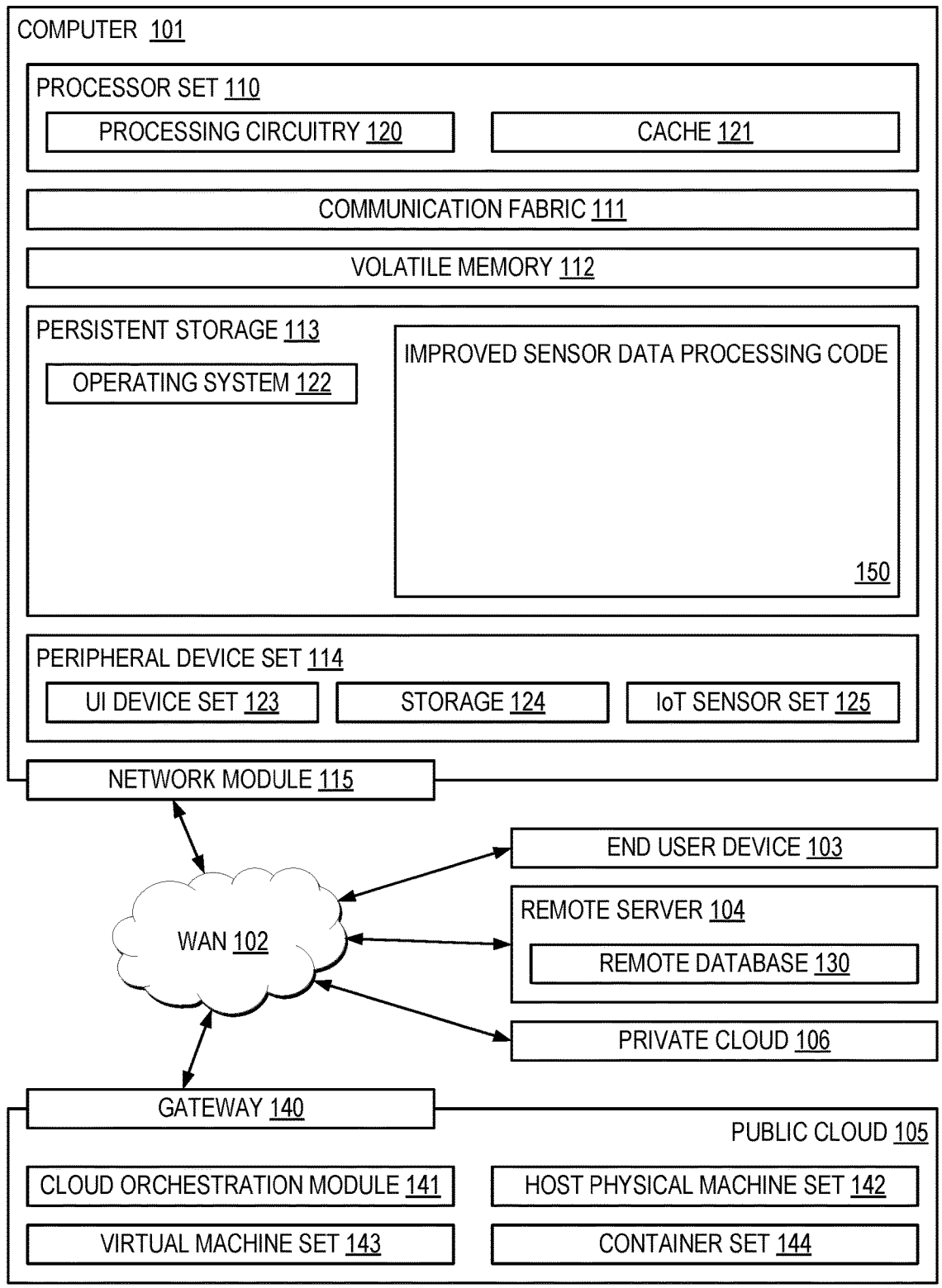
FIG. 1 is a diagram of a computing environment, in accordance with one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods and computer program products for managing large amounts of sensor data across distributed systems. Approaches herein evaluate sensor data at edge nodes themselves. This evaluation allows for determinations to be made as to whether any of the generated data should be transferred (e.g., copied) to a central location. Evaluating the extensive data that is generated at an edge location (e.g., node) and identifying specific portions to send to the central location significantly reduces the strain placed on the system as a whole. The evaluation also allows for determinations to be made as to whether any of the generated data should be removed (e.g., deleted) from memory at the edge location altogether. Evaluating the extensive data that is generated at an edge location and identifying specific portions (e.g., redundant data segments, null data segments, corrupted data segments, etc.) to remove from storage significantly reduces the strain placed on memory at the edge location, e.g., as will be described in further detail below.

In one general approach, a CIM includes: receiving, at an edge computing environment, internet of things (IoT) data generated by IoT devices in communication with the edge computing environment. One or more inference models are used at the edge computing environment to: classify the IoT data, and generate labeled metadata for the classified IoT data. The labeled metadata is further used at the edge computing environment to identify portions of the IoT data to transmit to a cloud computing environment. Copies of the identified portions of the IoT data are also sent to the cloud computing environment.

In another general approach, a CPP includes: a set of one or more computer-readable storage media, as well as program instructions. The program instructions are collectively stored in the set of one or more storage media and are for causing a processor set to perform the foregoing CIM.

In yet another general approach, a CS includes: a processor set and a set of one or more computer-readable storage media. The CS also includes program instructions that are collectively stored in the set of one or more storage media, and are for causing the processor set to perform the foregoing CIM.

Various aspects of the present disclosure are described by narrative text, flowcharts, block diagrams of computer systems and/or block diagrams of the machine logic included in computer program product (CPP) approaches. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product approach ("CPP approach" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as improved sensor data processing code at block 150 for evaluating (at an edge node) the extensive amount of data that is generated by IoT devices and identifying specific portions to send from the edge node to a central location and/or store in memory at the edge node. In addition to block 150, computing environment 100 includes, for example, computer 101, wide area network (WAN) 102, end user device (EUD) 103, remote server 104, public cloud 105, and private cloud 106. In this approach, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and IoT sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like.

Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various approaches, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some approaches, storage 124 may take the form of a quantum computing storage device for storing data in the form of qubits. In approaches where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some approaches, network control functions and network forwarding functions of network module 115 are performed on the same physical hardware device. In other approaches (for example, approaches that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some approaches, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some approaches, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other approaches a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this approach, public cloud 105 and private cloud 106 are both part of a larger hybrid cloud.

CLOUD COMPUTING SERVICES AND/OR MICROSERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some approaches, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some aspects, a system according to various approaches may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various approaches.

As noted above, continued advancements to computing power and the use of IoT devices cause data production to increase. For instance, the rise of smart enterprise endpoints has led to large amounts of data being generated at remote locations. Data production will only further increase with the growth of 5G, 6G, etc., networks and an increased number of connected mobile devices. This issue has also become more prevalent as the complexity of AI models increases, translating to more intense workloads and increased strain associated with applying the models to received data.

While cloud computing has been implemented in conventional systems in an effort to improve the ability to process this increasing amount of data, the unprecedented scale and complexity at which data is being created has outpaced network and infrastructure capabilities. Sending all device-generated data to a centralized data center or to a cloud location has resulted in bandwidth and latency issues in conventional systems. As more devices are able to produce data and the amount of data being produced by each device in a system continues to increase, the strain associated with transferring all generated data back to a central location (e.g., cloud computing node) is significantly intensified.

In sharp contrast to the foregoing shortcomings experienced by conventional products, approaches herein are able to reduce the impact that increasing data production rates have on system performance. Approaches prevent the strained network connections, data access times, etc., that are experienced in conventional products by evaluating generated data at the edge nodes themselves. In some approaches, this evaluation allows for determinations to be made as to whether any of the generated data should be transferred (e.g., copied) to a central location.

Evaluating the extensive data that is generated at an edge location (e.g., node) and identifying specific portions to send to the central location significantly reduces the strain placed on the system. In some approaches, the evaluation allows for determinations to be made as to whether any of the generated data should be removed (e.g., deleted) from memory at the edge location altogether. Evaluating the extensive data that is generated at an edge location and identifying specific portions (e.g., redundant data segments, null data segments, corrupted data segments, etc.) to remove from storage significantly reduces the strain placed on memory at the edge location, e.g., as will be described in further detail below.

Figure 2:
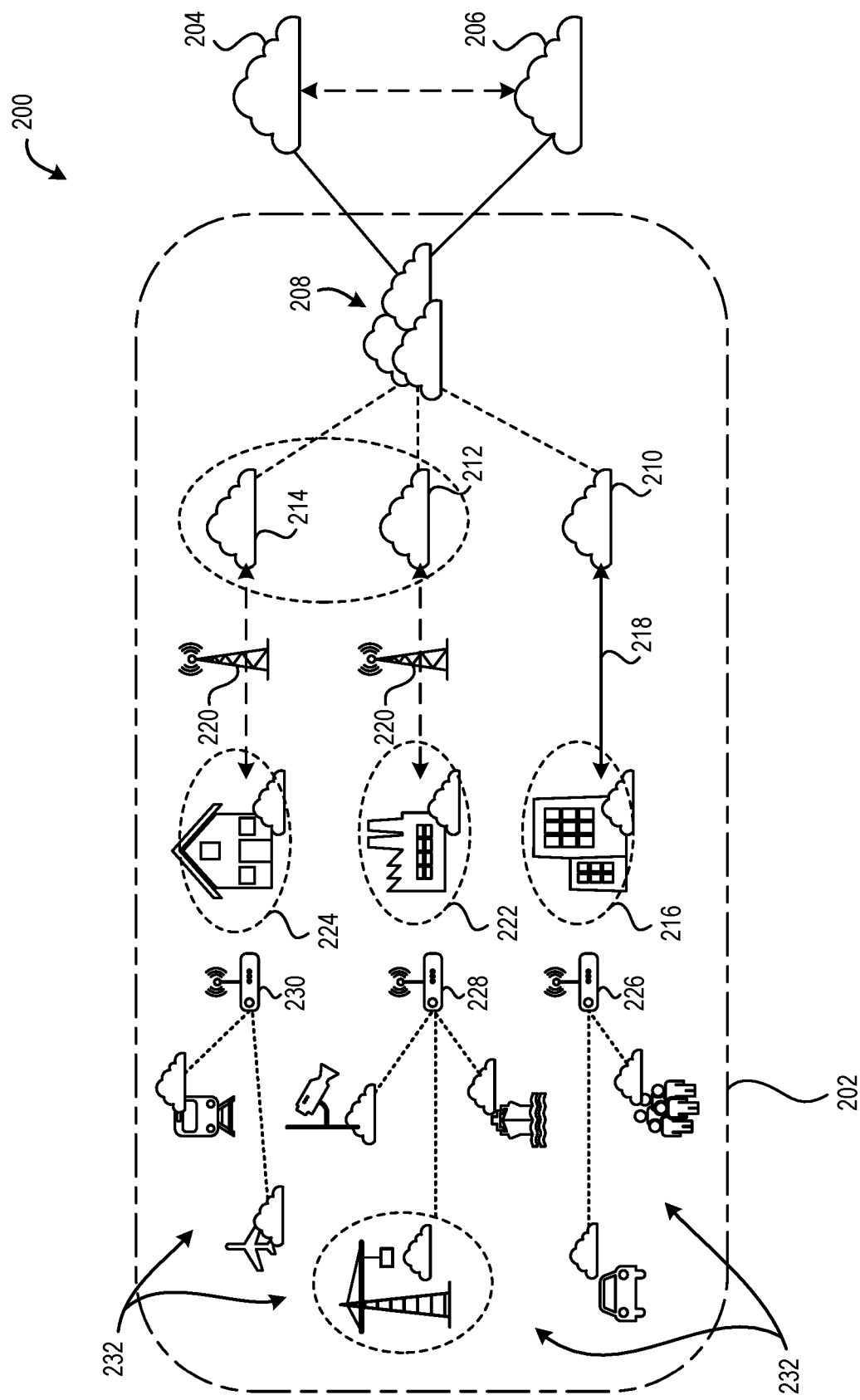
FIG. 2 is a representational view of a distributed system, in accordance with one approach.

Looking now to FIG. 2, a system 200, having a distributed architecture in accordance with one approach. As an option, the present system 200 may be implemented in conjunction with features from any other approach listed herein, such as those described with reference to the other FIGS., such as FIG. 1. However, such system 200 and others presented herein may be used in various applications and/or in permutations which may or may not be specifically described in the illustrative approaches or implementations listed herein. Further, the system 200 presented herein may be used in any desired environment. Thus FIG. 2 (and the other FIGS.) may be deemed to include any possible permutation.

As shown, the distributed system 200 includes an edge node (e.g., location) 202 that is connected to a public cloud server 204 and a private cloud server 206. The cloud servers 204, 206 interface with a regional network 208 that combines network traffic from edge networks 210, 212, 214. Network 210 may transmit information to and from a connection point that communicates with an edge cluster 216 along a physical communication channel 218 that extends therebetween. Depending on the approach, the physical communication channel 218 may include one or more cables, buses, Ethernet cords, etc. that allow for data, commands, responses, metadata, etc. to be exchanged between locations without using wireless connections. Networks 212 and 214 both utilize a communication infrastructure 220 to communicate with edge clusters 222 and 224, respectively. In some approaches, the communication infrastructure 220 is a cellular network model (e.g., 3G, 4G, 5G, 6G, etc.) that allows network 212 to communicate with edge cluster 222, and allows network 214 to communicate with edge cluster 224, over individual or shared broadband networks.

Each of the edge clusters 216, 222, 224 includes a router 226, 228, 230. Each of the routers 226, 228, 230 further establish connections with various edge devices 232. Edge clusters 216, 222, 224 are thereby able to communicate with various ones of the edge devices 232 by exchanging information, data, sensor readings, commands, control instructions, responses, metadata, etc., over the wireless connections that the routers 226, 228, 230 help extend therebetween. In some approaches, the edge devices 232 include IoT devices.

With respect to the present description, "IoT devices" are intended to include any piece of hardware, e.g., such as sensors, actuators, machines, appliances, etc., that are programmed for certain applications and can transmit data over a network connection. It follows that IoT devices may include sensor logs, Light Detection and Ranging (LIDAR) devices, cameras, global positioning system (GPS) receivers, or any other type of hardware that would be apparent to one skilled in the art after reading the present description. These IoT devices may further be embedded into other mobile devices, automobiles, micro data centers, industrial equipment, environmental sensors, medical devices, communication (e.g., cellular) distribution towers, etc., or any other IoT devices It follows that the edge devices 232 may include a wide range of components that are in communication with the edge clusters 216, 222, 224.

With continued reference to FIG. 2, each of the edge clusters 216, 222, 224 may thereby receive data from various ones of the edge devices 232. As noted above, edge devices 232 include IoT devices that collect information associated with device operation, environmental conditions, performance metrics, etc. The edge clusters 216, 222, 224 may receive a large amount of data from the edge devices 232 over time. As noted above, the amount of network bandwidth involved with transferring all data received from IoT devices to a central data storage and/or processing location has become infeasible as data production and the number of IoT devices continues to increase.

However, approaches herein inspect the data received from the edge devices 232 at the edge clusters 216, 222, 224 themselves. This distributes an initial data processing load across multiple locations, removing a significant amount of overhead from a central processing location that may otherwise be used to process this received data. Moreover, the edge clusters 216, 222, 224 are able to identify specific portions (e.g., sections) of the received data by applying one or more trained models to the data itself. Specific portions of received IoT data may thereby be identified by applying one or more trained models to the data itself, such that the identified IoT data may be handled in a specific manner.

In some approaches, certain portions (e.g., sections) of received IoT data may be identified at an edge location and selectively transmitted to a central cloud location. According to one example, anomalies in sensor data received from IoT devices 232 (e.g., images that cannot be labeled by a trained model, images that have an inference accuracy lower than a user defined threshold, etc.) may be flagged at one of the edge clusters 216, 222, 224. The anomalies may be identified at the edge location 202 and sent to a cloud server 204 and/or 206 to perform training (e.g., retraining) on one or more AI models that developed the trained model deployed at edge clusters 216, 222, 224. This allows for network bandwidth to be selectively used to transfer data that will make an impact on model training and performance. The AI models may include any type of model that mimics cognitive functions associated with human minds, including all aspects of learning, reasoning, perceiving, and problem solving. Accordingly, "AI models" as used herein may include any type of machine learning systems that have been trained on historical data to uncover patterns, deep learning models having layers of neural networks working together to process information, foundation models configured to generate sequences of related data elements, etc., or any other type of AI related system.

In some approaches, the edge clusters 216, 222, 224 are able to identify specific portions (e.g., sections) of the received data that should be stored in memory. Specific portions of received IoT data may thereby be identified and selectively added to memory storage that is present at the respective one of the edge clusters 216, 222, 224. According to one example, sensor readings correlated with system performance that is outside one or more predetermined ranges may be flagged as "abnormal system performance" and stored in memory. This allows for data storage capacity at the edge locations to be selectively used to store data that may provide training value.

In some approaches, the edge clusters 216, 222, 224 are able to identify specific portions (e.g., sections) of the received data that should be actively removed (e.g., deleted) from memory. Received IoT data that has been stored in memory may thereby be evaluated to determine whether any portions should be removed. For instance, to reduce data loss in-flight, all memory received from IoT devices may automatically be saved to memory, after which an evaluation may be performed. The evaluation may be used to identify portions of the received IoT data that should be removed from memory at the edge clusters 216, 222, 224. According to one example, redundant copies of sensor readings received from one or more IoT devices may be identified and intentionally removed from memory. This allows for data storage capacity at the edge locations to be more efficiently used to store relevant data.

It follows that the edge clusters 216, 222, 224 of FIG. 2 may each have different configurations. For example, in some implementations one or more of the edge clusters 216, 222, 224 may include a large (e.g., robust) processor coupled to a cache and a data storage array having a relatively high storage capacity. The edge clusters 216, 222, 224 may thereby be able to process and store a relatively large amount of data. As noted above, the edge clusters 216, 222, 224 may each receive data, commands, etc. from any number of IoT devices 232. The components included in the edge clusters 216, 222, 224 thereby preferably have a high storage capacity and throughput to accommodate the higher flow of data experienced from the IoT devices 232.

It should be noted that use of the term "data" herein may include any desired type of information. For instance, in different implementations data received from the IoT devices 232 can include raw sensor data, metadata, program commands, instructions, images, video, etc. Moreover, while implementations herein are described in the context of receiving data from IoT devices, this is in no way intended to be limiting. As noted above, any desired type of data may be received and processed at an edge cluster to determine how specific portions of the received data should be handled. It follows that each of the edge clusters 216, 222, 224 and/or other devices in the edge node location 202 may actually cause one or more data operations to be performed. According to an example, one or more processors at any of edge clusters 216, 222, 224 may be used to perform one or more operations of method 300 of FIG. 3.

Figure 3:
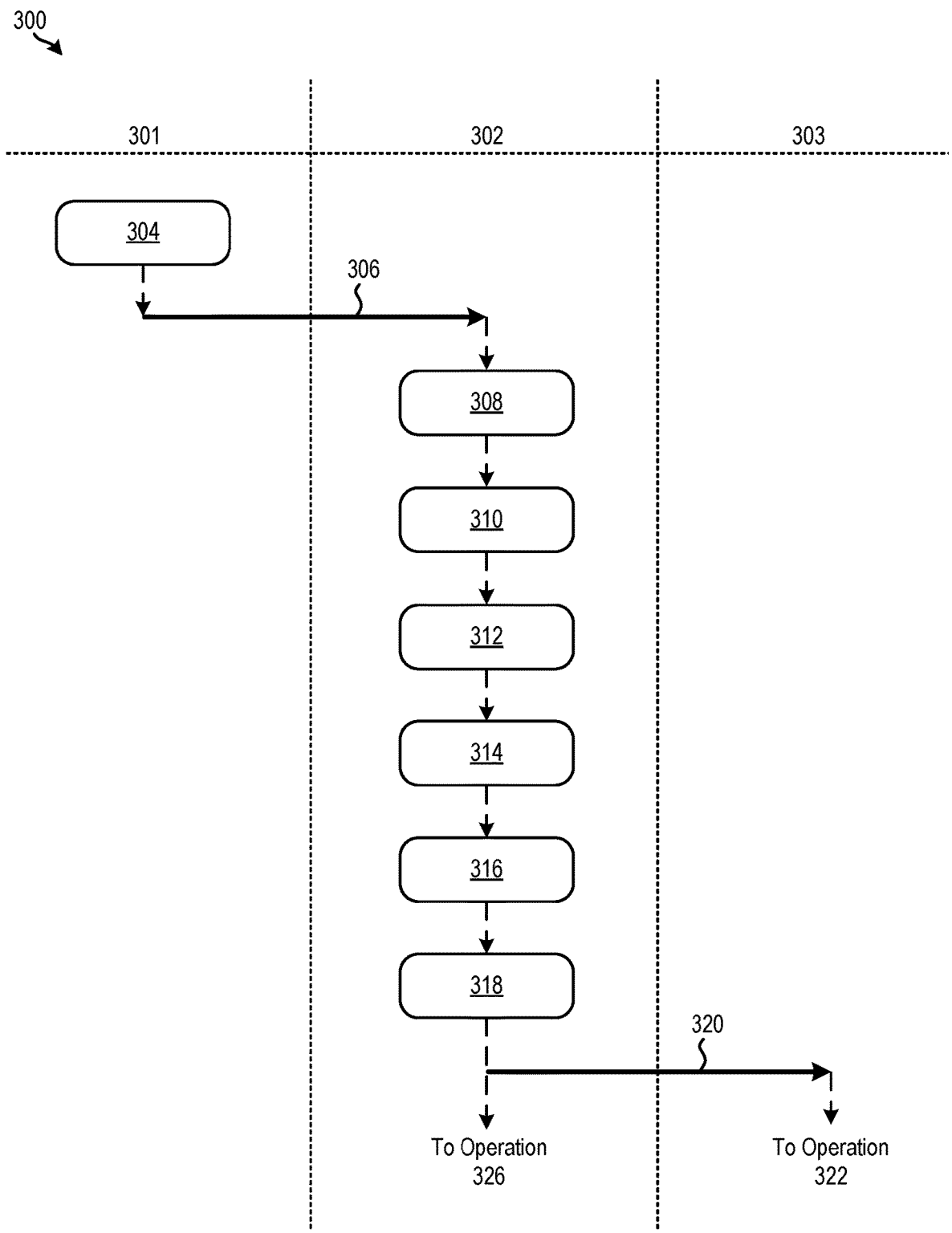
FIG. 3 is a flowchart of a method, in accordance with one approach.
Figure 3:
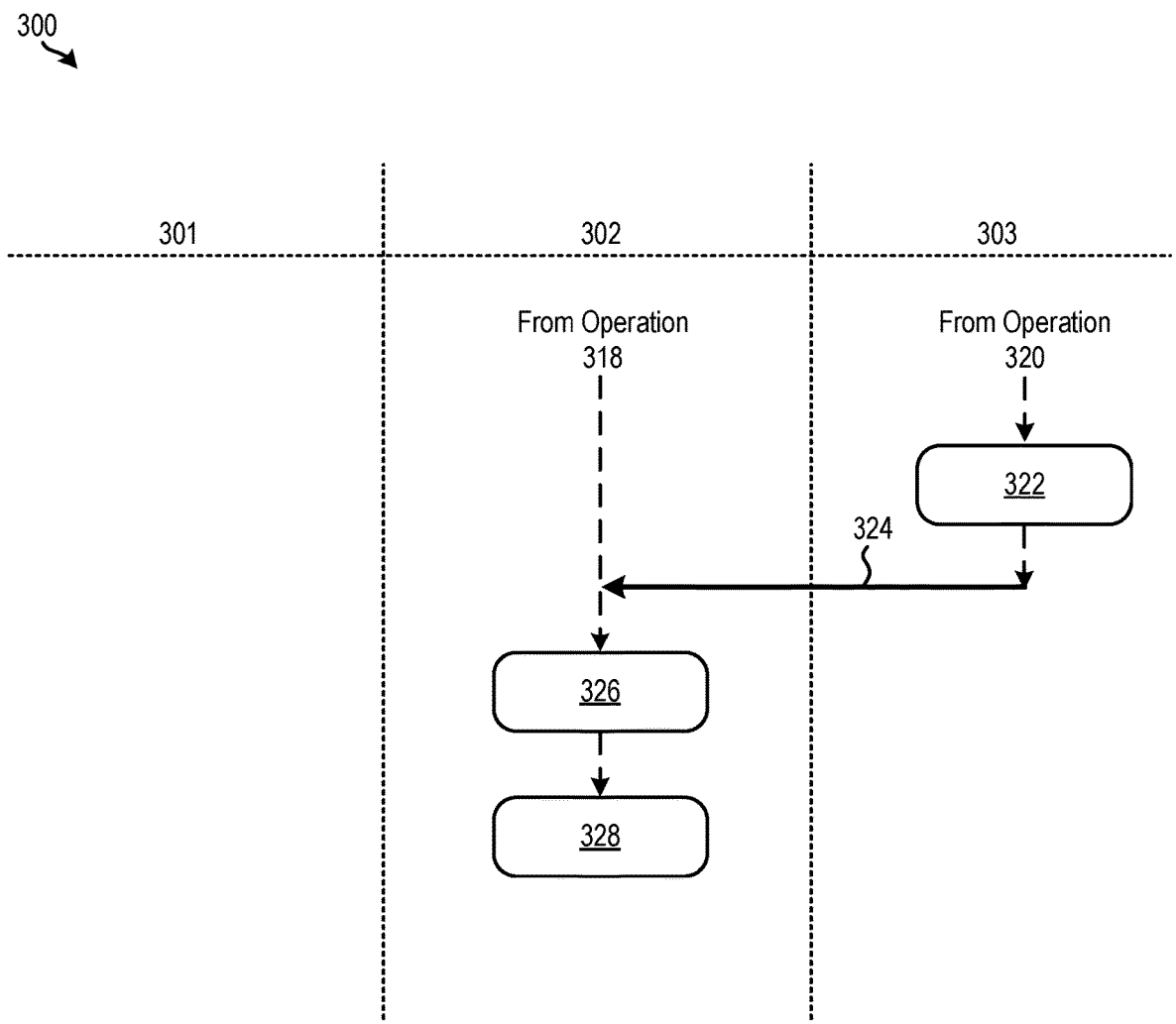

Looking now to FIG. 3, a method 300 for creating and managing inference metadata based data distribution at an edge computing environment of a distributed system is illustrated in accordance with one approach. Accordingly, the operations of method 300 may be performed continually in the background of an operating system without requesting input from a user (e.g., human). While certain information (e.g., warnings, reports, read requests, etc.) may be issued to a user, it is again noted that the various operations of method 300 can be repeated in an iterative fashion for each instance of new data detected at any of the edge nodes from one or more IoT devices (e.g., edge devices). Thus, method 300 may be performed in accordance with the present invention in any of the environments depicted in FIGS. 1-2, among others, in various approaches. Of course, more or less operations than those specifically described in FIG. 3 may be included in method 300, as would be understood by one of skill in the art upon reading the present descriptions.

Each of the steps of the method 300 may be performed by any suitable component of the operating environment. For example, each of the nodes 301, 302, 303 shown in the flowchart of method 300 may correspond to one or more processors positioned at a different location in a distributed data system. Moreover, each of the one or more processors are preferably configured to communicate with each other.

In various implementations, the method 300 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As mentioned above, FIG. 3 includes different nodes 301, 302, 303, each of which represent one or more processors, controllers, computer, etc., positioned at a different location in a distributed data storage system. For instance, node 301 may include processors associated with (e.g., located in, physically attached to, etc.) one or more IoT devices at an edge location a distributed compute system (e.g., see IoT devices 232 in edge location 202 of FIG. 2 above). Node 302 may include one or more processors located at an edge server of a distributed compute system (e.g., see edge clusters 216, 222, 224 of FIG. 2 above). Furthermore, node 303 may include one or more processors located at a remote cloud location of a distributed compute system (e.g., see cloud servers 204, 206 of FIG. 2 above). Accordingly, commands, data, requests, etc. may be sent between each of the nodes 301, 302, 303 over one or more networks depending on the approach.

It should further be noted that the various processes included in method 300 are in no way intended to be limiting, e.g., as would be appreciated by one skilled in the art after reading the present description. For instance, data sent from node 302 to node 303 may be prefaced by a request sent from node 303 to node 302 in some approaches. Additionally, the number of nodes included in FIG. 3 is in no way intended to be limiting. For instance, additional edge servers may also be coupled to the cloud location at node 303 in some approaches (e.g., see edge clusters 216, 222, 224 of FIG. 2 above). Accordingly, any desired number of edge servers may be connected to the cloud location. Similarly, any desired number of IoT devices may be connected to the edge server at node 302, e.g., as would be appreciated by one skilled in the art after reading the present description.

As shown in FIG. 3, operation 304 is performed at node 301. There, operation 304 includes collecting sensor data from one or more sensors that are associated with IoT devices. It follows that the collected sensor data is also referred to herein as "IoT data." As noted above, sensors may be positioned inside, physically coupled to an exterior of, positioned in a same area as, etc. one or more physical components. For example, an IoT device may include one or more electrical current sensors, temperature sensors, location sensors, cameras, etc. that each collect information associated with how the IoT device performs.

From operation 304, method 300 advances to operation 306 where the collected sensor data is transmitted to node 302. In some approaches, the sensor data may be at least temporarily collected in memory (e.g., a buffer) at node 301 before being transmitted to an edge server at node 302. In response to receiving the sensor data at the edge computing environment of node 302, operation 308 includes storing the received sensor data in memory. According to one approach, the sensor data may be stored in a data layer of memory at an edge server of node 302.

Operation 310 further includes storing any metadata that is associated with the sensor data, in memory. According to one approach, the metadata may be stored in a data catalog of memory at the edge server of node 302. The metadata may include any information that provides supplementary details associated with the sensor data. For instance, the metadata may include, but is in no way limited to, a date and/or time each segment of sensor data was produced, the IoT device that produced each segment of sensor data, identification of a model trained to process the sensor data, the name of the file or object associated with the data, etc.

Proceeding to optional operation 312, one or more policies may be applied to the stored metadata. In some approaches, the policies are based on (e.g., developed from) predetermined rules that can be applied to the sensor data to identify portions thereof. The policies applied in operation 312 may thereby identify one or more segments of the potentially vast amount of sensor data received from node 301 that should be handled in a particular manner. In preferred approaches, the portions of the sensor data that are identified by the policies undergo additional evaluation using one or more inference models. In other words, the policies may be used to identify specific portions of the sensor data that should be evaluated using one or more inference models (e.g., trained AI models). According to one example, a policy analyzes the metadata (that is associated with the received sensor data) based on one or more predefined rules that identify candidate portions of the sensor data that should be sent to one or more trained AI models for further inspection. These predefined rules and/or policies may be established by a user, shift depending on current performance (e.g., amount of sensor data currently being received), be adjusted in real-time in response to receiving instructions from a client, etc.

Operation 314 further includes classifying at least some of the sensor data received from node 301, while operation 316 includes generating labeled metadata for the classified portions of the sensor data. In some approaches, all sensor data received from node 301 is classified at node 302 and used to generate labeled metadata. Thus, operation 314 may classify all received sensor data, while operation 316 may generate labeled metadata for all the classified sensor data. However, in approaches where optional operation 312 identifies specific segments of the sensor data, operation 314 may only classify those specific segments, while operation 316 may only generate labeled metadata for the specific segments that are classified. In still other approaches, operation 314 may only classify sensor data that is not included in the specific segments identified in optional operation 312, while operation 316 may only generate labeled metadata for sensor data that is not included in the specific segments that are classified.

The process of classifying the received sensor data and generating the labeled metadata involves using one or more inference models. In other words, one or more inference models (e.g., AI models) may be used to evaluate the sensor data and produce outputs (e.g., labeled metadata) that provide insight into the sensor data as a whole. In some approaches, the inference models include one or more policies that are applied to the sensor data. Portions of the sensor data that are highlighted as a result of applying the one or more policies may thereby be identified and undergo classification. In some approaches, the inference models are used to produce labeled entries for the sensor data. In other approaches, the inference models output specific sections of the sensor data that match predetermined sensor profile(s).

With continued reference to method 300, the labeled metadata produced in operation 316 may be used to further evaluate the sensor data at node 302 and identify portions that should be handled in a specific manner. For example, the labeled metadata may be processed using one or more AI models implementing data placement policies that dictate when and/or where sensor data is moved and/or stored in a distributed network mesh. In some approaches, the AI models utilize the labeled metadata to identify specific sensor data that is valuable for training, and which should thereby be sent to a centralized cloud hub or data center for iterative model training.

AI models may also be created to evaluate labeled metadata to determine what data is not needed at an edge server (e.g., at node 302). Data identified by the AI models may thereby be intentionally removed (e.g., deleted) from memory at the edge server. AI models may also be created to evaluate labeled metadata to determine what specific portions (e.g., sections) of sensor data received at an edge location should be stored in memory. For instance, certain portions (e.g., sections) of sensor data received at an edge location may be identified and selectively added to memory storage that is present in the edge server at node 302. It follows that evaluating the stored metadata with AI models allows for a variety of actions to be taken on select portions (e.g., sections) of the sensor data at node 302. Some additional examples of actions that may be performed on portions of sensor data that are identified by one or more AI models include, but are in no way limited to, compressing identified portions of data, making duplicate copies of identified portions of data, encrypting identified portions of data, setting retention policies on identified portions of data, setting access permissions for each portion of data, setting data placement policies for each portion of data, redacting identified portions of data, etc.

Operation 318 thereby includes using the labeled metadata produced at node 302 to identify portions of the sensor data at node 302 to transmit to a cloud computing environment at node 303. As noted above, specific portions of the sensor data may be identified as being useful in training or retraining AI models at a cloud server. Approaches herein are thereby able to improve overall system performance by limiting network bandwidth use to transferring data that will make an impact on model training and performance.

Operation 320 further includes sending the identified portions from the edge server at node 302 to the central (e.g., cloud) server at node 303. Again, certain portions (e.g., sections) of the sensor data received at node 302 may be identified using the labeled metadata, and transmitted to a central cloud location where it may be used to retrain AI models. According to one example, anomalies in sensor data received from IoT devices (e.g., images that cannot be labeled by a trained model, images that have an inference accuracy lower than a user defined threshold, etc.) may be flagged at an edge server. The anomalies are identified by the edge server at node 302 and sent to a cloud location at node 303 along with instructions that cause the cloud location at node 303 to use the anomalies to retrain AI models. These anomalies may thereby be used at node 303 to perform training (e.g., retraining) on one or more AI models that developed a trained model used to perform operation 314 and/or operation 316. This allows for network bandwidth to be selectively used to transfer data that will make a positive impact on model training and performance.

A record of the sensor data that is sent to node 303 from node 302 may be maintained at node 302. The record keeps indications of what sensor data copies have been sent to node 303 to improve data retention. The record may thereby be updated in response to sending the identified portions from the edge server at node 302 to the central (e.g., cloud) server at node 303.

In response to receiving the sensor data at node 303, operation 322 includes using the sensor data to train or retrain one or more AI models. The sensor data may be used in some approaches to retrain AI models that produced the policies and/or rules that are used to evaluate sensor data as it is received at the edge servers (e.g., see node 302). In other words, the select portions of the sensor data returned to node 303 to perform retraining ultimately improves the accuracy by which newly received sensor data can be evaluated (e.g., classified), thereby desirably compounding improvements that occur in a positive feedback loop, e.g., as would be appreciated by one skilled in the art after reading the present description.

Operation 324 further includes returning any updates (e.g., improvements) to the AI models that are developed as a result of performing the retraining in operation 322. The updates are returned to the edge server at 302 such that newly received sensor data may be evaluated more efficiently by utilizing updated AI models that apply updated classification to generate the labeled metadata. As noted above, this process works as a positive feedback loop that improves model accuracy over time as more sensor data is analyzed.

Returning to operation 318, the labeled metadata formed in operation 316 may be used to perform additional analysis on received sensor data. As noted above, AI models may be created to evaluate labeled metadata to determine what data is not needed at an edge server (e.g., at node 302). Operation 326 thereby includes using the labeled metadata to identify sections of the sensor data that should be removed from node 302. Data identified in operation 326 may thereby be intentionally removed (e.g., deleted) from memory at the edge server to reduce strain on data storage capacity at node 302. See operation 328. For example, all sensor data received from IoT devices may initially be stored in memory before being evaluated with one or more AI models to identify portions that should be removed. In some approaches, the AI models identify redundant copies of sensor data that are deduplicated to conserve data storage capacity.

In other approaches, method 300 may include evaluating the labeled metadata to determine what specific portions (e.g., sections) of sensor data received at an edge location should actively be stored in memory. For instance, certain portions (e.g., sections) of sensor data received at an edge location may be identified and selectively added to memory storage that is present in the edge server at node 302. According to one example, sensor readings correlated with system performance that is outside one or more predetermined ranges may be flagged as "abnormal system performance" and stored in memory. This allows for data storage capacity at the edge locations to be selectively used to store data that may provide local training value.

Figure 4:
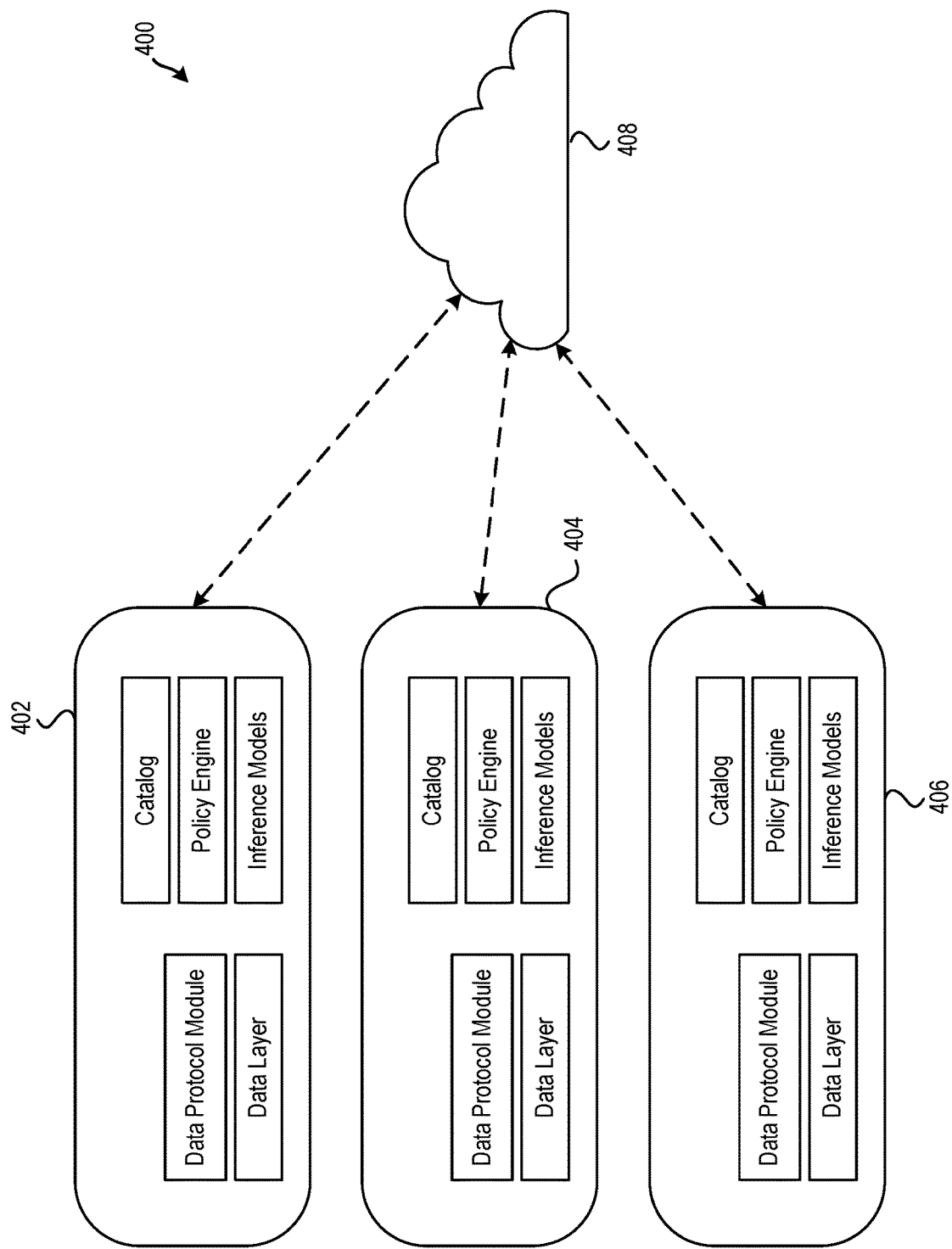
FIG. 4 is a representational view of a distributed system in accordance with one in-use example.

Referring now to FIG. 4, a distributed system 400 is illustrated in accordance with an in-use example, which is in no way intended to be limiting. As shown, edge devices 402, 404, 406 are each connected to a network 408 that provides a communication channel to a network edge and/or cloud server, e.g., depending on the approach.

While each of the edge devices 402, 404, 406 may have any desired compute, memory, persistent storage, GPUs, networking and/or communications hardware, etc., they are shown in the present approach as having similar configurations. While in no way intended to be limiting, each of the edge devices 402, 404, 406 include a Data Protocol Module (e.g., such as AWS S3 or MQTT, etc.), a Data Layer in persistent storage, a Catalog of the data ingested through the Data Protocol Module and stored in the Data Layer, a Policy Engine that maps metadata policies to one or more user defined actions, and one or more Inference Models (e.g., trained AI models).

As noted above, data is ingested through the Data Protocol Module and stored persistently in the Data Layer. System metadata associated with the newly stored data is further stored in the data catalog. One or more policies may thereby be used to analyze the metadata based on rules defined by the end user, and identify candidate data to be sent to one or more of the Inference Engines for inspection. The Inference Engines analyze the data and provide outputs in the form of labels which are stored in the metadata Catalog. Moreover, an association may be made between the labels and the original metadata while storing the label metadata.

Depending on the approach, the Catalog may be maintained at a centralized location or in a hub and spoke distributed manner where there is a catalog of inference results at each edge device 402, 404, 406 that is then aggregated into a global catalog using network 408. Alternatively, each edge site may maintain a separate Catalog without centralized synchronization.

One or more data distribution policies may also be used to identify data that should be uploaded to a cloud location over network 408. The data distribution policy may evaluate various metadata types, e.g., such as filtering criteria, time window, bandwidth rate limiting, encryption settings, source and target destinations, etc., as input. According to an example, filtering criteria that incorporates custom metadata (e.g., labels) such as undetected-object flagging. The data distribution policy may thereby be able to identify subsets of sensor data that was ingested by an edge server and yet not identified using any of the current models. Identified subsets of the data are thereby sent upstream to an entity in the edge topology where the model training takes place. The Policy Engine may also be configured to query the metadata Catalog to get the list of objects that match the criteria. The Policy Engine sends the data to the destination taking into account the additional parameters such as bandwidth limits, encryption settings, etc. Moreover, in some approaches the local data catalog at the edge device can be updated to indicate that there is now a copy of the object at an upstream edge device.

It follows that approaches herein are able to evaluate computational storage at edge locations with metadata workflows to facilitate the active learning process of performing data curation and labeling as described herein. Again, approaches are able to reduce the amount of sensor data that is sent from an edge location over network back to a central location. As sensor data is generated by IoT devices and ingested into the storage, one or more inference models are invoked to classify and label the incoming sensor data. In one approach the labels (e.g., results of analyzing the data with the inference models) are captured in a metadata catalog. Metadata that is specific to each respective inference model is also captured into the metadata catalog and associated with the inference results and other metadata to provide "auditability" pertaining to what model version was used to derive the results. In another approach, the results are captured as custom metadata with the object, or extended attributes in a file system, or as a combination of storing the results in object filesystem extended attributes, and in the data catalog.

In some approaches, the inference models may be applied to sensor data inline as it is received from IoT devices. Inferences may thereby be made on the sensor data in real time. In other approaches, inference models may be invoked as a post processing operation, during which a system metadata event notification triggers one or more inference models to inspect the sensor data. In yet other approaches, a hybrid method for inferencing may be invoked that establishes thresholds for inline processing. In response to one or more of the established thresholds being crossed (e.g., a value shifting outside a predetermined range) post process inferencing may be enacted to avoid slowing down the data ingestion path.

It will be clear that the various features of the foregoing systems and/or methodologies may be combined in any way, creating a plurality of combinations from the descriptions presented above.

It will be further appreciated that approaches of the present invention may be provided in the form of a service deployed on behalf of a customer to offer service on demand.

The descriptions of the various approaches of the present invention have been presented for purposes of illustration, but are not intended to be exhaustive or limited to the approaches disclosed. Many modifications and variations will be apparent to those of ordinary skill in the art without departing from the scope and spirit of the described approaches. The terminology used herein was chosen to best explain the principles of the approaches, the practical application or technical improvement over technologies found in the marketplace, or to enable others of ordinary skill in the art to understand the approaches disclosed herein.

What is claimed is:

1. A computer-implemented method (CIM), comprising:
   receiving, at an edge computing environment, internet of things (IoT) data generated by IOT devices in communication with the edge computing environment;
   storing the IOT data in a data layer at the edge computing environment in response to receiving the IOT data;
   using, at the edge computing environment, one or more inference models to:
      classify the IOT data, and
      generate labeled metadata for the classified IOT data;
   using, at the edge computing environment, the labeled metadata to identify sections of the IOT data to remove from the data layer;
   removing the identified sections of the IOT data from the data layer;
   using, at the edge computing environment, the labeled metadata to identify portions of the IOT data to transmit to a cloud computing environment; and
   sending copies of the identified portions of the IOT data to the cloud computing environment.

2. The CIM of claim 1, wherein the sending of the copies of the identified portions of the IOT data to the cloud computing environment includes:
   sending one or more instructions to use the copies of the identified portions of the IOT data to train a source model that produced the one or more inference models.

3. The CIM of claim 2, further comprising:
   receiving, at the edge computing environment, an updated version of the inference models from the cloud computing environment; and
   using the updated version of the inference models to:
      classify new IOT data, and
      generate labeled metadata for the classified new IOT data.

4. The CIM of claim 1, further comprising:
   indicating, in the data layer, that copies of the identified portions of the IOT data have been sent to the cloud computing environment.

5. The CIM of claim 1, wherein the classifying of the IOT data includes:
   applying one or more policies to metadata associated with the IOT data;
   selecting portions of the IOT data that are highlighted as a result of applying the one or more policies; and
   classifying the selected portions of the IOT data.

6. The CIM of claim 5, wherein the generating of the labeled metadata includes:
   generating labeled metadata for the selected portions of the IOT data.

7. The CIM of claim 1, wherein the one or more inference models include trained AI models.

8. A computer program product (CPP), comprising:
   a set of one or more computer-readable storage media; and
   program instructions, collectively stored in the set of one or more storage media, for causing a processor set to perform the following computer operations:
      receive, at an edge computing environment, internet of things (IoT) data generated by IOT devices in communication with the edge computing environment;
      store the IOT data in a data layer at the edge computing environment in response to receiving the IOT data;
      use, at the edge computing environment, one or more inference models to:
         classify the IOT data, and
         generate labeled metadata for the classified IOT data;
      use, at the edge computing environment, the labeled metadata to identify sections of the IOT data to remove from the data layer;
      remove the identified sections of the IOT data from the data layer;
      use, at the edge computing environment, the labeled metadata to identify portions of the IOT data to transmit to a cloud computing environment; and
      send copies of the identified portions of the IOT data to the cloud computing environment.

9. The CPP of claim 8, wherein the sending of the copies of the identified portions of the IOT data to the cloud computing environment includes:
   sending one or more instructions to use the copies of the identified portions of the IOT data to train a source model that produced the one or more inference models.

10. The CPP of claim 9, wherein the program instructions are for causing the processor set to further perform the following computer operations:
    receive, at the edge computing environment, an updated version of the inference models from the cloud computing environment; and
    use the updated version of the inference models to:
       classify new IOT data, and
       generate labeled metadata for the classified new IOT data.

11. The CPP of claim 8, wherein the program instructions are for causing the processor set to further perform the following computer operations:

indicate, in the data layer, that copies of the identified portions of the IOT data have been sent to the cloud computing environment.

12. The CPP of claim 8, wherein the classifying of the IOT data includes:

applying one or more policies to metadata associated with the IOT data;

selecting portions of the IOT data that are highlighted as a result of applying the one or more policies; and classifying the selected portions of the IOT data.

13. The CPP of claim 12, wherein the generating of the labeled metadata includes:

generating labeled metadata for the selected portions of the IOT data.

14. The CPP of claim 8, wherein the one or more inference models include trained AI models.

15. A computer system (CS), comprising:

a processor set;

a set of one or more computer-readable storage media;

program instructions, collectively stored in the set of one or more storage media, for causing the processor set to perform the following computer operations:

receive, at an edge computing environment, internet of things (IoT) data generated by IOT devices in communication with the edge computing environment;

store the IOT data in a data layer at the edge computing environment in response to receiving the IOT data;

use, at the edge computing environment, one or more inference models to:

classify the IOT data, and generate labeled metadata for the classified IOT data;

use, at the edge computing environment, the labeled metadata to identify sections of the IOT data to remove from the data layer;

remove the identified sections of the IOT data from the data layer;

use, at the edge computing environment, the labeled metadata to identify portions of the IOT data to transmit to a cloud computing environment; and send copies of the identified portions of the IOT data to the cloud computing environment.

16. The CS of claim 15, wherein the program instructions are for causing the processor set to further perform the following computer operations:

indicate, in the data layer, that copies of the identified portions of the IOT data have been sent to the cloud computing environment.

17. The CS of claim 15, wherein the classifying of the IOT data includes:

applying one or more policies to metadata associated with the IOT data;

selecting portions of the IOT data that are highlighted as a result of applying the one or more policies;

classifying the selected portions of the IOT data; and generating labeled metadata for the selected portions of the IOT data.

\* \* \* \* \*